US012664211B2

(12) United States Patent
Rose

(10) Patent No.: US 12,664,211 B2
(45) Date of Patent: Jun. 23, 2026

(54) METHOD AND SYSTEM FOR GUIDING DISASSEMBLY AND REASSEMBLY OF COMPONENTS OF A DEVICE

(71) Applicant: Mark Aaron Rose, Arvada, CO (US)

(72) Inventor: Mark Aaron Rose, Arvada, CO (US)

( * ) Notice: Subject to any disclaimer, the term of this patent is extended or adjusted under 35 U.S.C. 154(b) by 246 days.

(21) Appl. No.: 18/752,400

(22) Filed: Jun. 24, 2024

(65) Prior Publication Data

US 2024/0346070 A1    Oct. 17, 2024

Related U.S. Application Data

(60) Provisional application No. 63/528,393, filed on Jul. 23, 2023.

(51) Int. Cl.
*G06F 16/58* (2019.01)
*G06F 9/451* (2018.01)
*G06F 16/587* (2019.01)

(52) U.S. Cl.
CPC .......... *G06F 16/5866* (2019.01); *G06F 9/453* (2018.02); *G06F 16/587* (2019.01)

(58) Field of Classification Search
CPC ..... G06F 16/5866; G06F 9/453; G06F 16/587
See application file for complete search history.

(56) References Cited

U.S. PATENT DOCUMENTS

| | | | | |
|---|---|---|---|---|
| 11,875,705 | B1 * | 1/2024 | Park | G06F 3/011 |
| 11,886,543 | B2 * | 1/2024 | Weese | G06F 18/2178 |
| 12,396,813 | B2 * | 8/2025 | Fuerst | A61B 34/25 |
| 12,541,485 | B1 * | 2/2026 | Mishra | G06F 16/148 |
| 2008/0086468 | A1 * | 4/2008 | Jing | G06F 16/58 |
| | | | | 707/999.005 |
| 2018/0032882 | A1 * | 2/2018 | Joshi | G06N 20/00 |
| 2022/0156824 | A1 * | 5/2022 | Henderson | G06Q 30/0625 |
| 2022/0215135 | A1 * | 7/2022 | Shortridge | G06F 30/13 |
| 2024/0391038 | A1 * | 11/2024 | Srikanth | B23P 19/04 |
| 2024/0403503 | A1 * | 12/2024 | Tsemach | B27M 3/18 |
| 2024/0428472 | A1 * | 12/2024 | El-Sana | G06Q 10/0631 |
| 2025/0378449 | A1 * | 12/2025 | Henderson | G06Q 30/0625 |
| 2026/0107129 | A1 * | 4/2026 | Liu | H04W 8/22 |

* cited by examiner

*Primary Examiner* — Delomia L Gilliard

(57) ABSTRACT

A method and system of guiding disassembly and reassembly of components of a device, is disclosed. A processor captures at least one image of the device at various stages of disassembly. A plurality of components of the device being disassembled is determined in the at least one image of the device based on visual detection of each of the plurality of components by a user. The plurality of components is consecutively numbered in the at least one image to determine a plurality of numbered components based on tapping, by the user, on each of the plurality of components via a user interface. Metadata is added corresponding to the plurality of components in the at least one image via a user interface. The least one image is stored with the plurality of numbered components, and associated metadata in a database for easy access and retrieval during reassembly.

14 Claims, 9 Drawing Sheets

Capturing at least one image of the device at various stages of disassembly 902

Visually detecting a plurality of components in the at least one image of the device using a deep learning model 904

Consecutively numbering, by the processor, the plurality of components in the at least one image to determine a plurality of numbered components 906

Adding metadata corresponding to the plurality of components in the at least one image via a user interface 908

Storing the at least one image with the plurality of numbered components, and associated metadata in a database for easy access and retrieval during reassembly 910

100

102

104

300A

300B

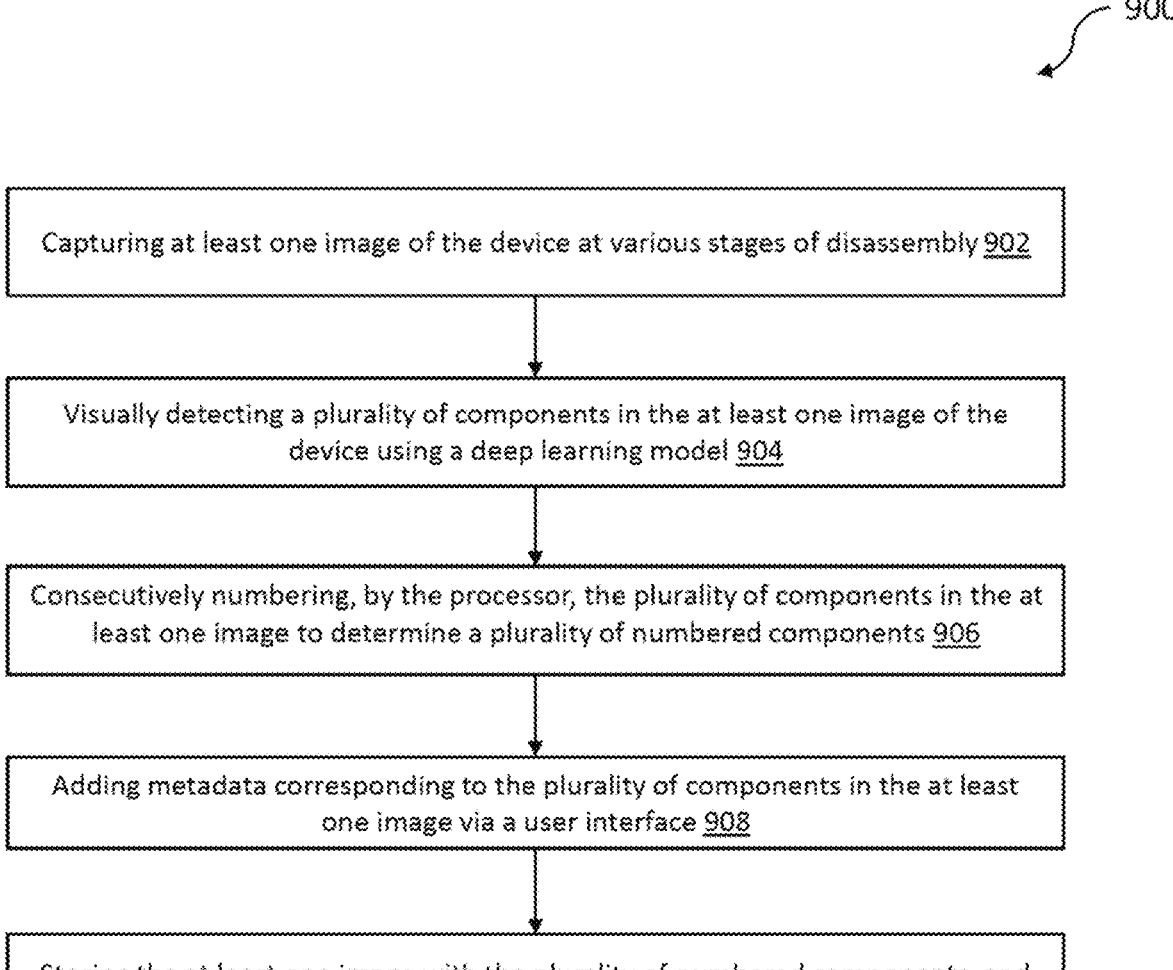

900

Capturing at least one image of the device at various stages of disassembly 902

Visually detecting a plurality of components in the at least one image of the device using a deep learning model 904

Consecutively numbering, by the processor, the plurality of components in the at least one image to determine a plurality of numbered components 906

Adding metadata corresponding to the plurality of components in the at least one image via a user interface 908

Storing the at least one image with the plurality of numbered components, and associated metadata in a database for easy access and retrieval during reassembly 910

FIG. 9

METHOD AND SYSTEM FOR GUIDING DISASSEMBLY AND REASSEMBLY OF COMPONENTS OF A DEVICE

RELATED APPLICATIONS

This application claims the benefit of the provisional patent application Ser. No. 63/528,393, filed on Jul. 23, 2023.

TECHNICAL FIELD

This disclosure relates generally to device disassembly and reassembly and more particularly to a method and system for guiding disassembly and reassembly of components of a device.

BACKGROUND

Device disassembly and reassembly are essential procedures used in a variety of industries, such as industrial maintenance, electronics, and vehicle repair. In these procedures, intricate apparatus or equipment must be carefully disassembled and then precisely reassembled with all of its parts. Notwithstanding their significance, these jobs can present a great deal of difficulty and complexity, which frequently results in mistakes and inefficiencies. In order to solve these problems, our patent application presents a novel way to speed up the disassembly and reassembly procedures.

When people try to disassemble and then reassemble gadgets, they often run into a few common issues. First of all, the inability to recognize and arrange a device's numerous components after disassembly might result in a laborious and error-prone reassembly process. Second, precise documentation of the disassembly process is impeded by the absence of an all-encompassing tracking system. Replicating the precise processes during reassembly is challenging because users find it difficult to write down the sequential sequence and locations of removed components. These challenges are further compounded by the complexity of contemporary electronics, which have intricated internal systems and interdependent parts. There is a higher possibility of misplacing or reinstalling parts incorrectly, which could cause issues with functionality or break the equipment. Additionally, novice users or those lacking specialized technical knowledge face heightened challenges when attempting to disassemble and reassemble equipment, due to limited awareness of internal workings and component linkages.

The difficulties involved in disassembly and reassembly have been addressed by a number of ways. Among these are comprehensive instructions manuals and guides that offer precise directions for disassembly and reassembly procedures. These are usually utilized by technicians and do-it-yourselfers. Several video tutorials are available on the internet that shows how to disassemble and reassemble different devices, offering visual assistance to go along with written instructions. A variety of specialized tools and kits, such as magnetic mats for sorting small parts and labeled containers for storing components, have been developed to help with this process. Some software programs let users log and monitor the disassembly process, frequently by taking pictures and notes on where components are located and in what order they are assembled.

These solutions are available, but they have certain drawbacks, like the fact that they can be difficult to use, particularly for complicated systems. Videos are useful, but they can't always meet the unique requirements of every user or device because they frequently lack real-time adaptation and don't guard against user errors. The tools can assist in organizing components, but they do not address the problem of tracking the disassembly sequence or ensuring correct reassembly. Additionally, they require the user to frequently pause and replay sections, which can be inefficient. The software solutions that are currently available are frequently not intuitive and can be challenging to use effectively. Additionally, their practical utility may be limited due to their lack of integration with physical instruments.

Therefore, there is a requirement for a method and system for guiding disassembly and reassembly of components of a device. The method and system overcome these challenges by introducing a comprehensive system and method that provides a structured approach to disassembly, ensuring components are identified and organized efficiently. The method and system incorporate an integrated tracking system that accurately records the sequential order and locations of removed components, facilitating easier reassembly. The method and system are designed for users of all skill levels, from novices to experts, making it easier to disassemble and reassemble devices without errors. The method and system effectively manage the sophisticated internal structures and interdependencies of modern electronics, reducing the likelihood of misplacement or improper reinstallation of components.

SUMMARY OF THE INVENTION

In an embodiment, a method for guiding disassembly and reassembly of components of a device. The method may include capturing, by a processor, at least one image of the device at various stages of disassembly via one or more sensors. The method may further include determining, by the processor, a plurality of components of the device being disassembled in the at least one image of the device based on visual detection of each of the plurality of components by a user. The method may further include consecutively numbering, by the processor, the plurality of components in the at least one image to determine a plurality of numbered components based on tapping, by the user, on each of the plurality of components via a user interface. The method may further include adding, by the processor, metadata corresponding to the plurality of components in the at least one image via the user interface. In an embodiment, the metadata added to the images includes information such as the original location of each component, its purpose, or specific instructions related to its removal or reinstallation. The method may further include storing, by the processor, the at least one image with the plurality of numbered components, and associated metadata in a database for easy access and retrieval during reassembly.

In another embodiment, a system for guiding disassembly and reassembly of components of a device is disclosed. The system may include processor coupled with a memory communicably coupled to the processor. The memory may store processor-executable instructions, which when executed by the processor, may cause the processor to capture at least one image of the device at various stages of disassembly. The processor may further determine a plurality of components of the device being disassembled in the at least one image of the device based on visual detection of each of the plurality of components by a user. The processor may further consecutively number the plurality of components in the at least one image to determine a plurality of numbered components based on tapping, by the user, on each of the plurality of components via a user interface. The processor may further add metadata corresponding to the plurality of components in the at least one image via the user interface. In an embodiment, the metadata added to the images includes information such as the original location of each component, its purpose, or specific instructions related to its removal or reinstallation. The system may further include a database coupled to the processor for storing the at least one image with the plurality of numbered components, and associated metadata for easy access and retrieval during reassembly.

In another embodiment, a non-transitory computer-readable medium storing computer-executable instructions for guiding disassembly and reassembly of components of a device is disclosed. The computer-executable instructions may be configured for capturing at least one image of the device at various stages of disassembly. The computer-executable instructions may be further configured for determining a plurality of components of the device being disassembled in the at least one image of the device based on visual detection of each of the plurality of components by a user. The computer-executable instructions may be further configured for consecutively numbering the plurality of components in the at least one image to determine a plurality of numbered components based on tapping, by the user, on each of the plurality of components via a user interface. The computer-executable instructions may be further configured for adding metadata corresponding to the plurality of components in the at least one image via the user interface. In an embodiment, the metadata added to the images includes information such as the original location of each component, its purpose, or specific instructions related to its removal or reinstallation. The computer-executable instructions may be further configured for storing the at least one image with the plurality of numbered components, and associated metadata in a database for easy access and retrieval during reassembly.

It is to be understood that both the foregoing general description and the following detailed description are exemplary and explanatory only and are not restrictive of the invention, as claimed.

BRIEF DESCRIPTION OF THE DRAWING

The accompanying drawings, which are incorporated in and constitute a part of this disclosure, illustrate exemplary embodiments and, together with the description, serve to explain the disclosed principles.

FIG. 9 illustrates a flowchart of a method of guiding disassembly and reassembly of components of a device, in accordance with an embodiment of present disclosure.

DETAILED DESCRIPTION OF THE DRAWINGS

Figure 1:
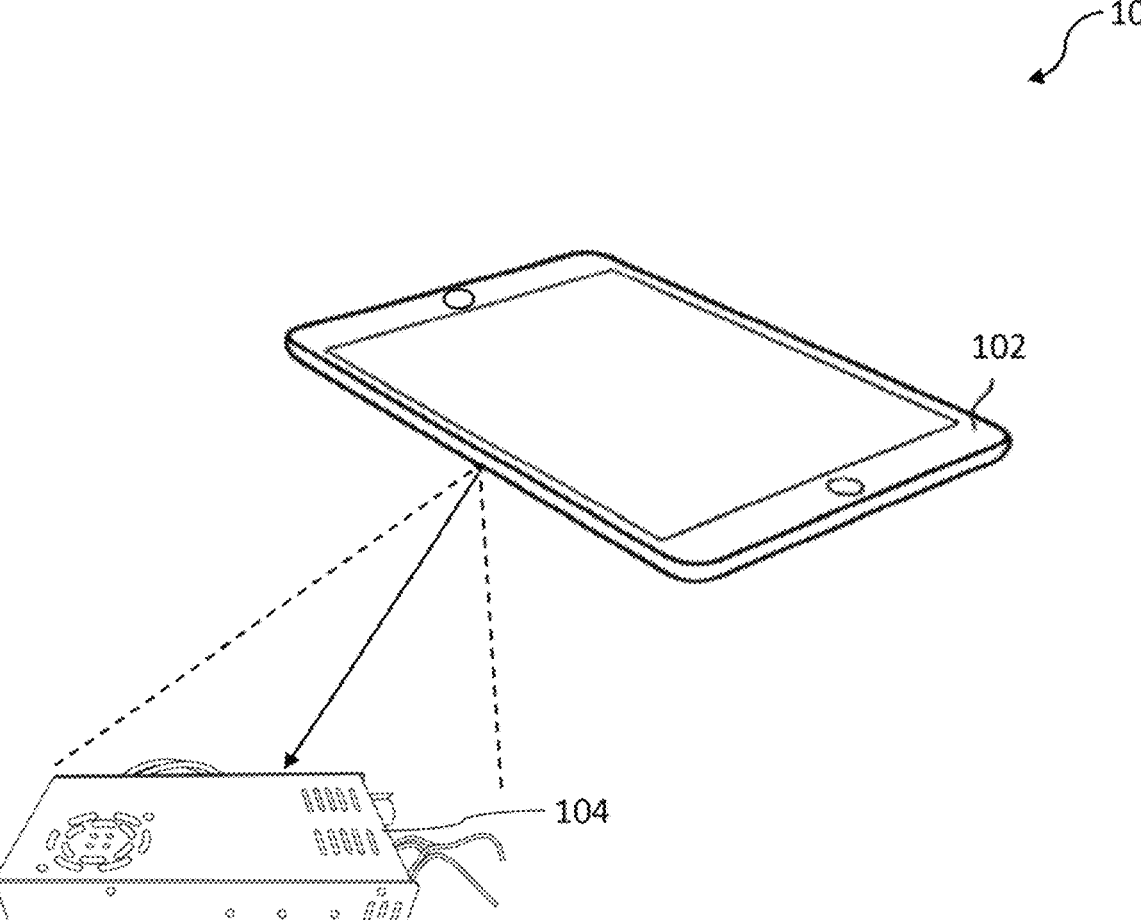
FIG. 1 illustrates an example network environment in which a disassembly and reassembly guidance system may be implemented, in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

The disclosed method and system aim to provide a structured approach that improves the accuracy of disassembling devices, ensuring each component is correctly identified and organized.

The disclosed method and system aim to introduce a comprehensive tracking system that allows users to easily document the disassembly process, capturing images and adding metadata for each component.

The disclosed method and system aim to minimize errors during the reassembly process by providing visual guides and detailed information about each component's original position and function.

The disclosed method and system aim to streamline the overall process of disassembly and reassembly, saving time and effort for users by offering an organized and methodical approach.

The disclosed method and system aim to create a user-friendly system that is accessible to both experienced technicians and novice users, thereby improving the overall experience in device maintenance and repair.

The disclosed method and system aim to enable users to add detailed metadata to each component image, including location, purpose, and reinstallation instructions, enhancing the documentation and reassembly process.

The disclosed method and system aim to provide tools such as divided trays or numbered tags that help physically organize disassembled components, preventing misplacement and confusion.

The disclosed method and system aim to utilize smartphone applications and intelligent algorithms for automatic component detection, numbering, and tracking, leveraging modern technology to aid in device maintenance.

The disclosed method and system aim to offer a reverse playback feature in the application that guides users through the reassembly process using sequentially captured images, ensuring components are reinstalled correctly.

The disclosed method and system aim to ensure that every component is managed comprehensively throughout the disassembly and reassembly phases, maintaining a high level of organization and accuracy.

The disclosed method and system aim to improve the effectiveness of maintenance and repair tasks by reducing the likelihood of errors and making the process more efficient reliable.

The disclosed method and system aim to facilitate the transfer of knowledge by providing a detailed and documented disassembly and reassembly process that can be used as a reference by different users.

Referring now to FIG. 1, an example network environment 100 in which a disassembly and reassembly guidance system may be implemented is illustrated, in accordance with an embodiment of the present disclosure. The network environment 100 includes a computing device 102, and a device 104.

The computing device 102 may be, for example, a portable computing device such as a tablet device, a laptop computer, a smartphone, a smart watch, or other appropriate devices that include one or more sensors, such as image sensors, that include one or more wired or wireless communication interfaces, such as one or more wireless communications interfaces, such as one or more universal serial bus (USB) interfaces, near-field communication (NFC) radios, wireless local area network (WLAN) radios, Bluetooth radios, Zig-bee radios, cellular radios, and/or other wireless radios. In FIG. 1, by way of an example, the computing device 102 may be depicted as a tablet device. An example computing device 102 may be, and/or may include all or part of the computing device discussed below with respect to FIG. 2.

Figure 2:
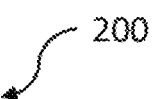
FIG. 2 illustrates an example computing device that may be used in a disassembly and reassembly guidance system, in accordance with an embodiment of the present disclosure.
Figure 2:
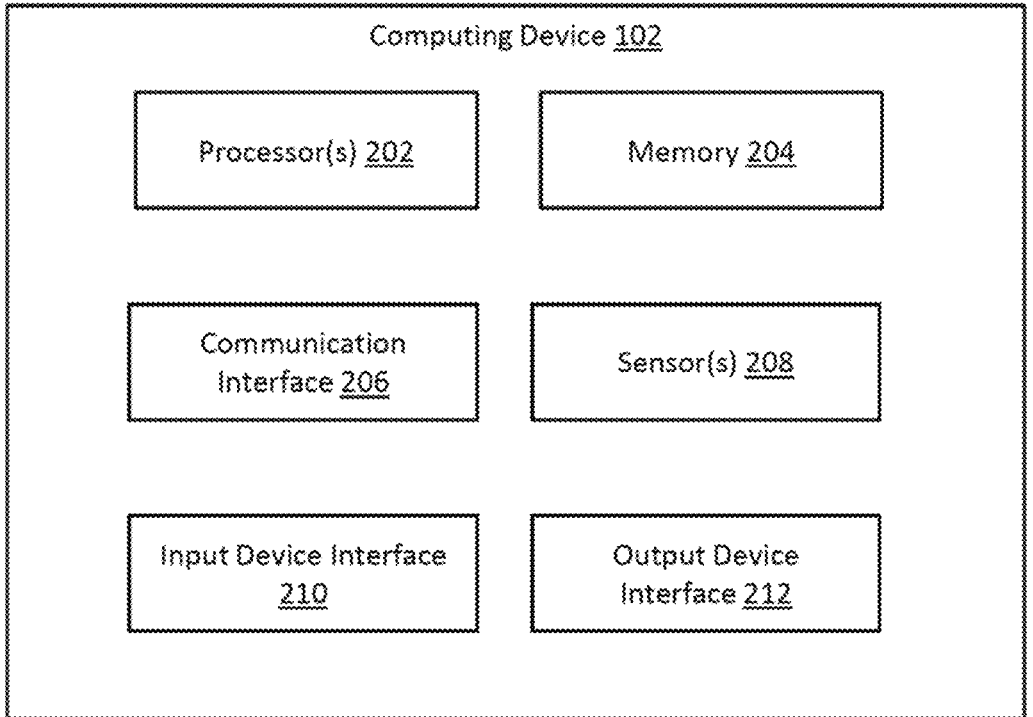

Referring now to FIG. 2 a block diagram 200 an example computing device 102 that may be used in a disassembly and reassembly guidance system 100 is disclosed, in accordance with an embodiment of the present disclosure. The computing device 102 may include various types of computer readable media and interfaces for various types of computer readable media. The computing device 102 includes a processor 202, a memory 204, a communication interface 206, one or more sensor 208, input device interface 210, and output device interface 212.

In an embodiment, examples of processor(s) 202 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other processors that can be used to execute similar functions.

In an embodiment, the memory 204 may store instructions that, when executed by the processor 202, may cause the processor 202 to guide disassembly and reassembly of the components of the device, as discussed in more detail below. In an embodiment, the memory 204 may be a non-volatile memory or a volatile memory. Examples of non-volatile memory may include, but are not limited to, a flash memory, a Read Only Memory (ROM), a Programmable ROM (PROM), Erasable PROM (EPROM), and Electrically EPROM (EEPROM) memory. Further, examples of volatile memory may include, but are not limited to, Dynamic Random Access Memory (DRAM), and Static Random-Access memory (SRAM).

The communication interface 206 may include suitable logic, circuitry, and/or code that enables wired or wireless communication, such as over the network. The communication interface 208 may include, for example, one or more of a Bluetooth communication interface, an NFC interface, a Zigbee communication interface.

The one or more sensor(s) 208 may include one or more image sensors that may be used to capture the images of the device 104. The input device interface 210 enables a user to communicate information and select commands to the computing device 102. Input devices that may be used with the input device interface 210 may include, for example, alpha-numeric keyboards, touchpads, and pointing devices. Output devices that may be used with the output device interface 212 may include, for example, printers and display devices, such as a flexible display, an organic light emitting diode (OLED) display, a projector, or other device for outputting information. One or more implementations may include devices that function as both input and output device, such as a torch-screen.

Referring back to FIG. 1, the device 104 may be any physical device that can be used to perform one or more tasks, movements and the like. For example, the device 104 may include a processor (controller) for executing commands (or instructions) and memory for storing commands. The device 104 may include one or more wired or wireless communication interfaces, such as one or more wireless communications interfaces, such as one or more universal serial bus (USB) interfaces, near-field communication (NFC) radios, wireless local area network (WLAN) radios, Bluetooth radios, Zig-bee radios, cellular radios, and/or other wireless radios.

For explanatory purposes, the device 104 of FIG. 1 is depicted as including a plurality of components that are all connected, e.g. each component is connected to at least one other component. Furthermore, the device 104 may be only a single connectable component, or a single component, of a plurality of components.

The one or more sensors, such as an image sensor, may be used to capture at least one image of the device 104 at various stages of disassembly. The computing device 102 may determine the plurality of components of the device being disassembled in the at least one image of the device 104 based on visual detection of each of the plurality of components by a user. The computing device 102 may further consecutively number the plurality of components in the at least one image to determine a plurality of numbered components based on tapping, by the user, on each of the plurality of components via a user interface.

The computing device 102 may further add metadata corresponding to the plurality of components in the at least one image via a user interface. In an embodiment the metadata added to the images may include information such as the original location of each component, its purpose, or specific instructions related to its disassembly and reassembly.

The computing device 102 may further store the at least one image with the plurality of numbered components, and associated metadata in a database for easy access and retrieval during reassembly.

Figure 3A:
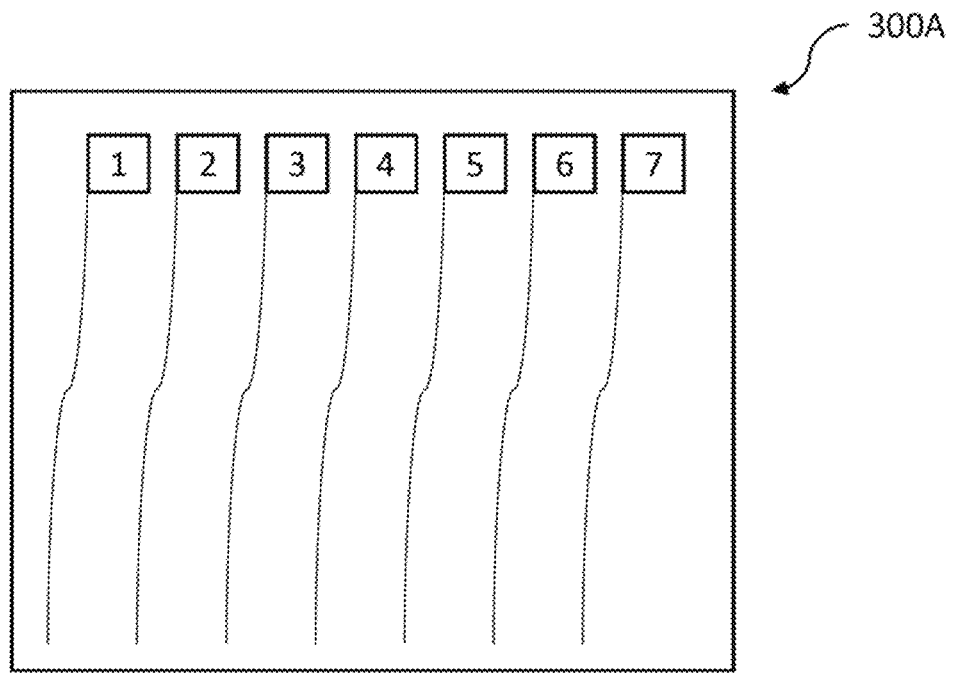
FIG. 3A illustrates example affixable numbered tags, in accordance with an embodiment of the present disclosure.

Referring now to FIG. 3A, example affixable numbered tags 300A is illustrated, in accordance with an embodiment of the present disclosure. In an embodiment, a first set of disassembled components corresponding to a first set of the plurality of components with an affixable numbered tags for physically organizing the first set of disassembled components.

Figure 3B:
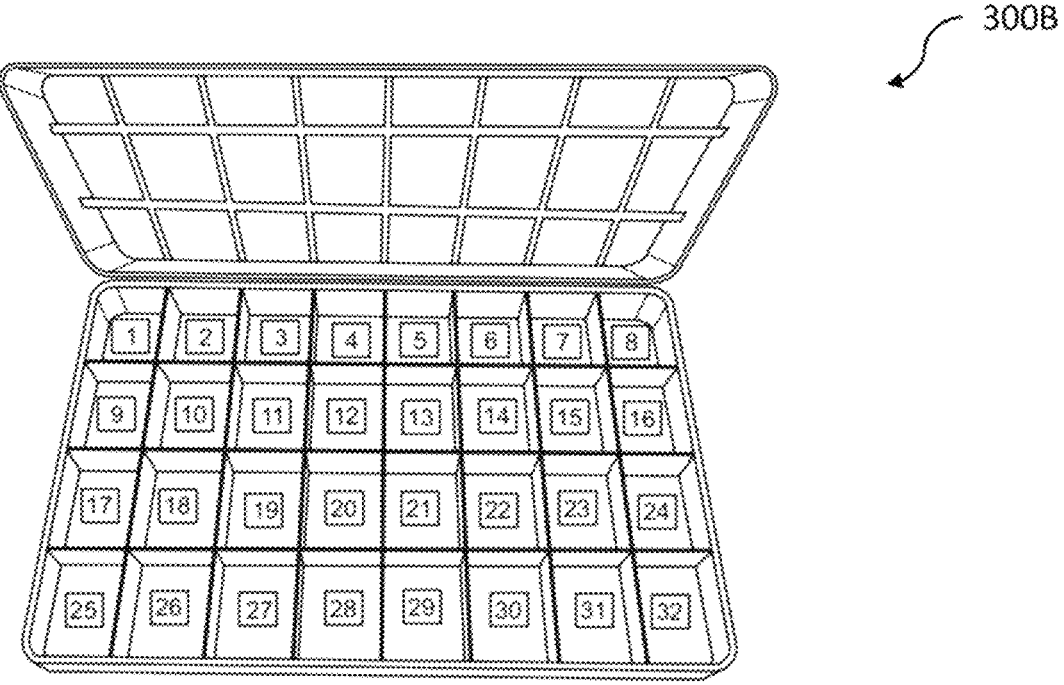
FIG. 3B illustrates an example divided tray, in accordance with an embodiment of the present disclosure.

Referring now to FIG. 3B, an example divided tray 300B is illustrated, in accordance with an embodiment of the present disclosure. In an embodiment, a second set of disassembled components corresponding to a second set of the plurality of components may be provided in a divided tray for physically organizing the second set of disassembled components.

Referring back to FIG. 1, the computing device 102 may further allow a user to follow reverse order of the disassembly of the device through the plurality of numbered components, to guide the reassembly. The computing device 102 may further display the component-specific metadata during the reassembly to provide additional instructions for accurate reinstallation of the first set of disassembled components and the second set of disassembled components.

Figure 4:
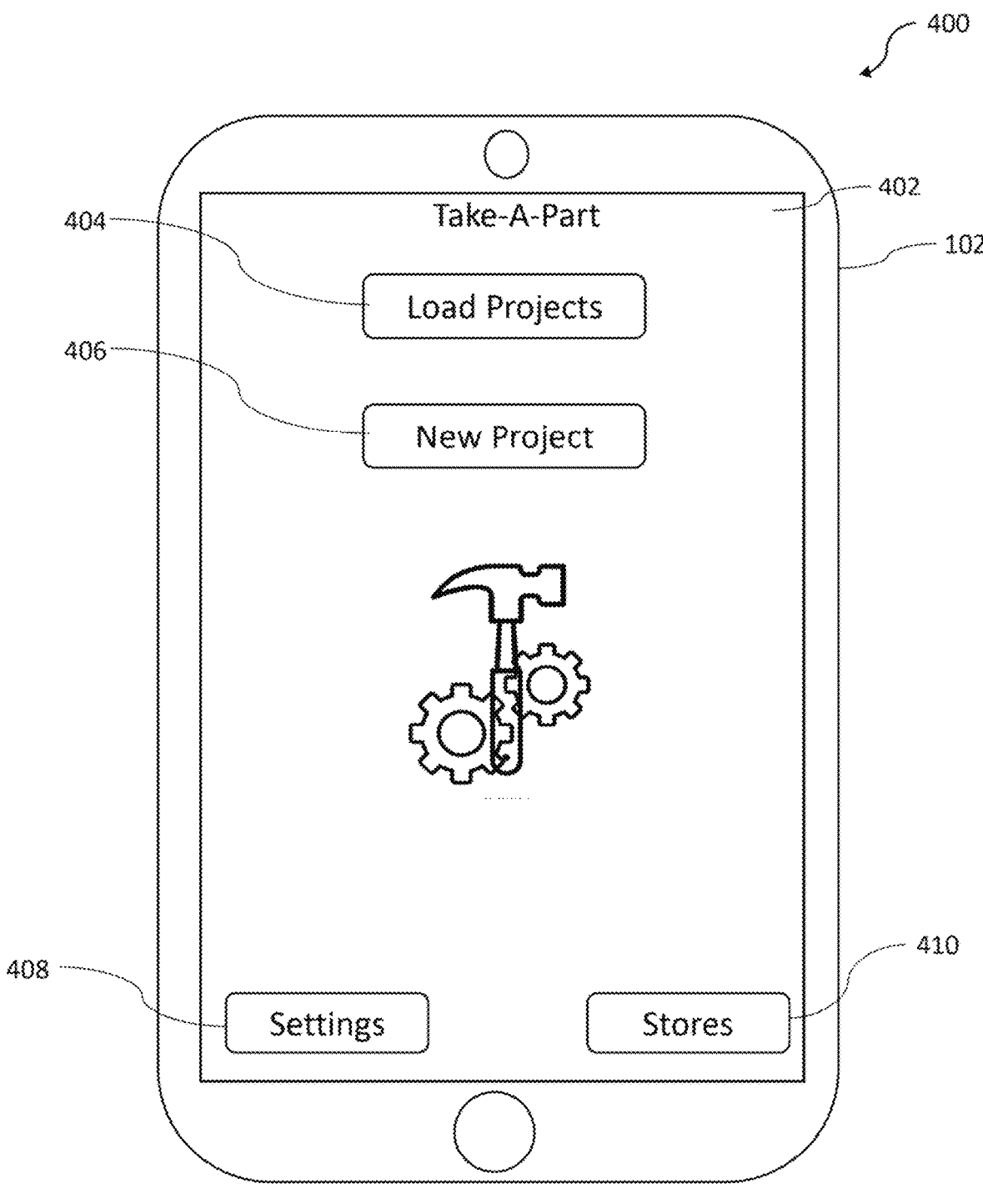
FIG. 4 illustrates an example computing device displaying an example user interface for guiding disassembly and reassembly of components of a device, in accordance with an embodiment of the present disclosure.

Referring now to FIG. 4, an example 400 computing device 102 displaying an example user interface 402 for guiding disassembly and reassembly of components of the device 104, in accordance with an embodiment of the present disclosure. The user interface 402 may include a first display area 404 corresponding to loading a new project of guiding disassembly and reassembly of components of the device 104. The user interface 402 may include a second display area 406 corresponding to a new project. The user interface 402 may include a third display area 408 corresponding to settings of the user interface 402. The user interface 402 may include a fourth display area 410 corresponding to stores of the user interface 402.

Figure 5:
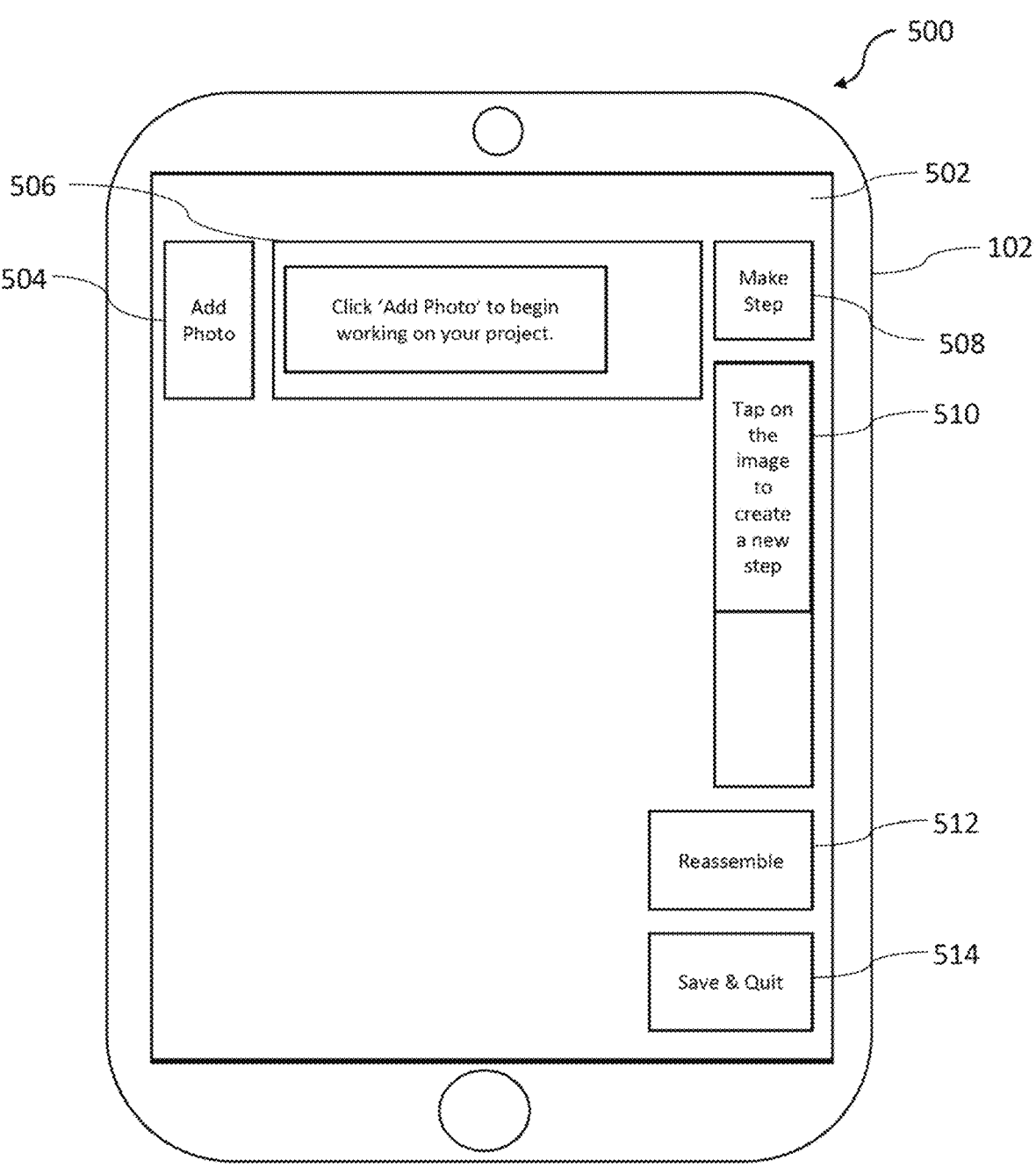
FIG. 5 illustrates an example computing device displaying an example user interface for guiding disassembly and reassembly of components of a device, in accordance with an embodiment of the present disclosure.

Referring now to FIG. 5, an example 500 computing device 102 displaying an example user interface 502 for guiding disassembly and reassembly of components of a device 104, in accordance with an embodiment of the present disclosure. The user interface 502 may include a first display area 504 corresponding to adding a photo of a device. The user interface 502 may include a second display area 506 corresponding to clicking on the added photo to begin working on the project. The user interface 502 may include a third display area 508 corresponding to make step. The user interface 502 may include a fourth display area 510 corresponding to tapping on the image to create a new step. The user interface 502 may include a fifth display area 512 corresponding to reassembling of the device 104. The user interface 502 may include a sixth display area 514 corresponding to saving and quit the project of the user interface 502.

Figure 6:
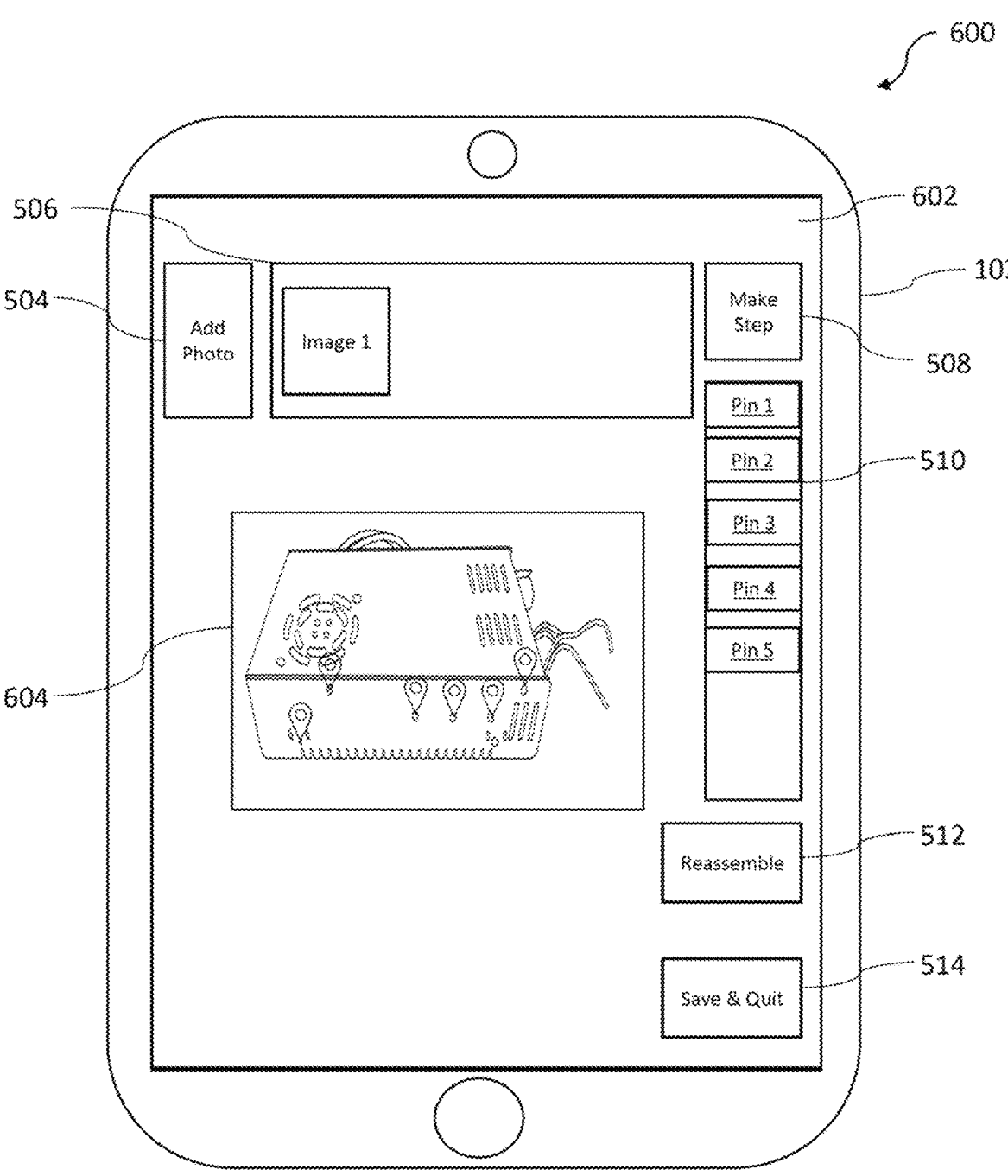
FIG. 6 illustrates an example computing device displaying an example user interface for guiding disassembly and reassembly of components of a device, in accordance with an embodiment of the present disclosure.

Referring now to FIG. 6, an example 600 computing device 102 displaying an example user interface 602 for guiding disassembly and reassembly of components of a device 104, in accordance with an embodiment of the present disclosure. The user interface 602 may include a first display area 504 corresponding to adding a photo of a device. The user interface 602 may include a second display area 506 corresponding to clicking on the added photo to begin working on the project. The user interface 602 may include a third display area 508 corresponding to make step. The user interface 502 may include a fourth display area 510 corresponding to tapping on the image to create a new step. The user interface 602 may include a fifth display area 512 corresponding to reassembling of the device 104. The user interface 602 may include a sixth display area 514 corresponding to saving and quit the project of the user interface 502. The user interface 602 may include a seventh display area 604 corresponding to an image of the device 104. The image may include the device 104 with the second set of disassembled components corresponding to the second set of the plurality of components that may be provided in the divided tray 300B for physically organizing the second set of disassembled components.

Figure 7:
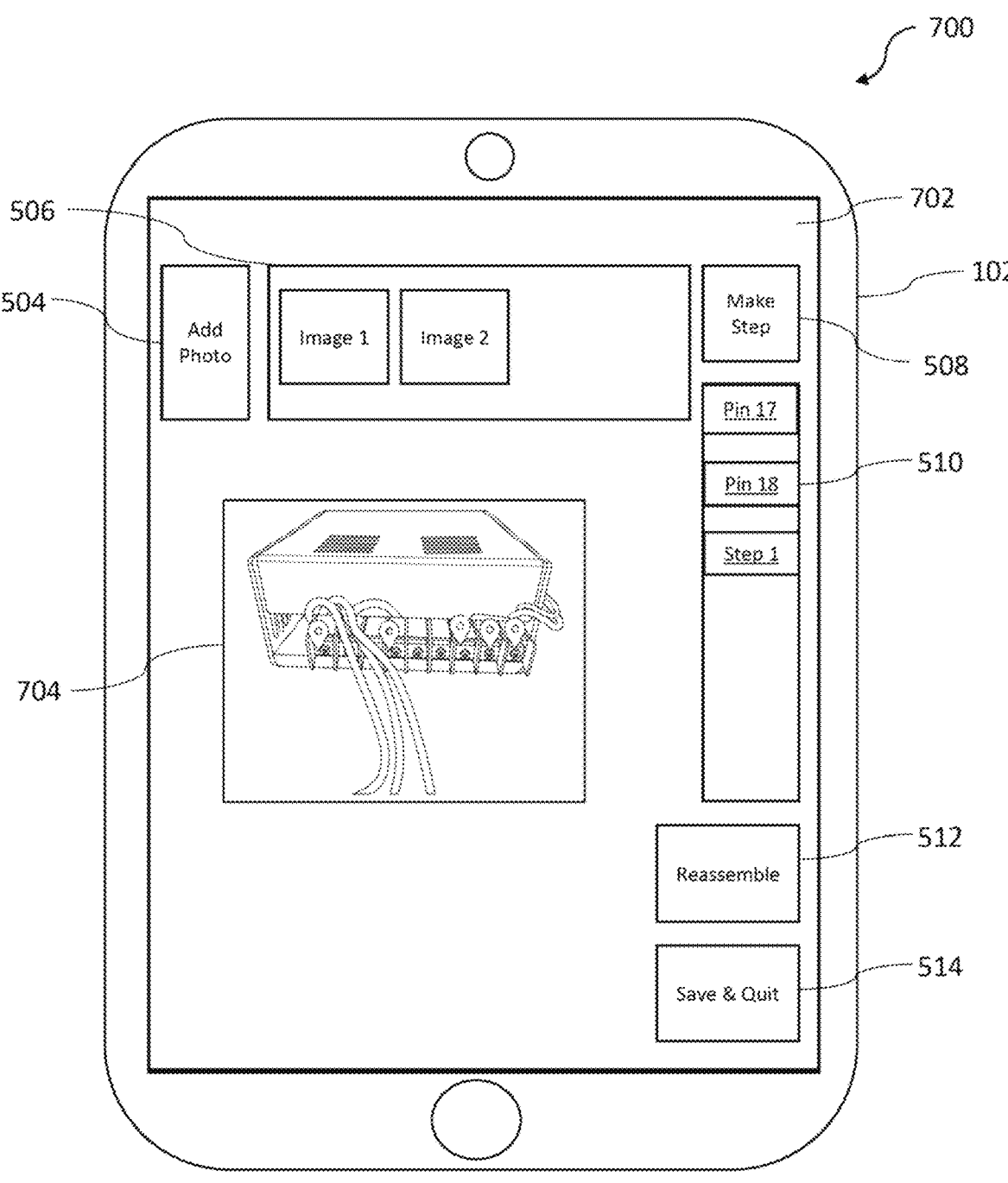
FIG. 7 illustrates an example computing device displaying an example user interface for guiding disassembly and reassembly of components of a device, in accordance with an embodiment of the present disclosure.

Referring now to FIG. 7, an example 700 computing device 102 displaying an example user interface 702 for guiding disassembly and reassembly of components of a device 104, in accordance with an embodiment of the present disclosure. The user interface 702 may include a first display area 504 corresponding to adding a photo of a device. The user interface 702 may include a second display area 506 corresponding to clicking on the added photo to begin working on the project. The user interface 702 may include a third display area 508 corresponding to make step. The user interface 702 may include a fourth display area 510 corresponding to tapping on the image to create a new step. The user interface 702 may include a fifth display area 512 corresponding to reassembling of the device 104. The user interface 702 may include a sixth display area 514 corresponding to saving and quit the project of the user interface 502. The user interface 702 may include a seventh display area 704 corresponding to an image of the device 104. The image may include the device 104 with the first set of disassembled components corresponding to the first set of the plurality of components that may be provided with an affixable numbered tags 300A for physically organizing the first set of disassembled components.

Figure 8:
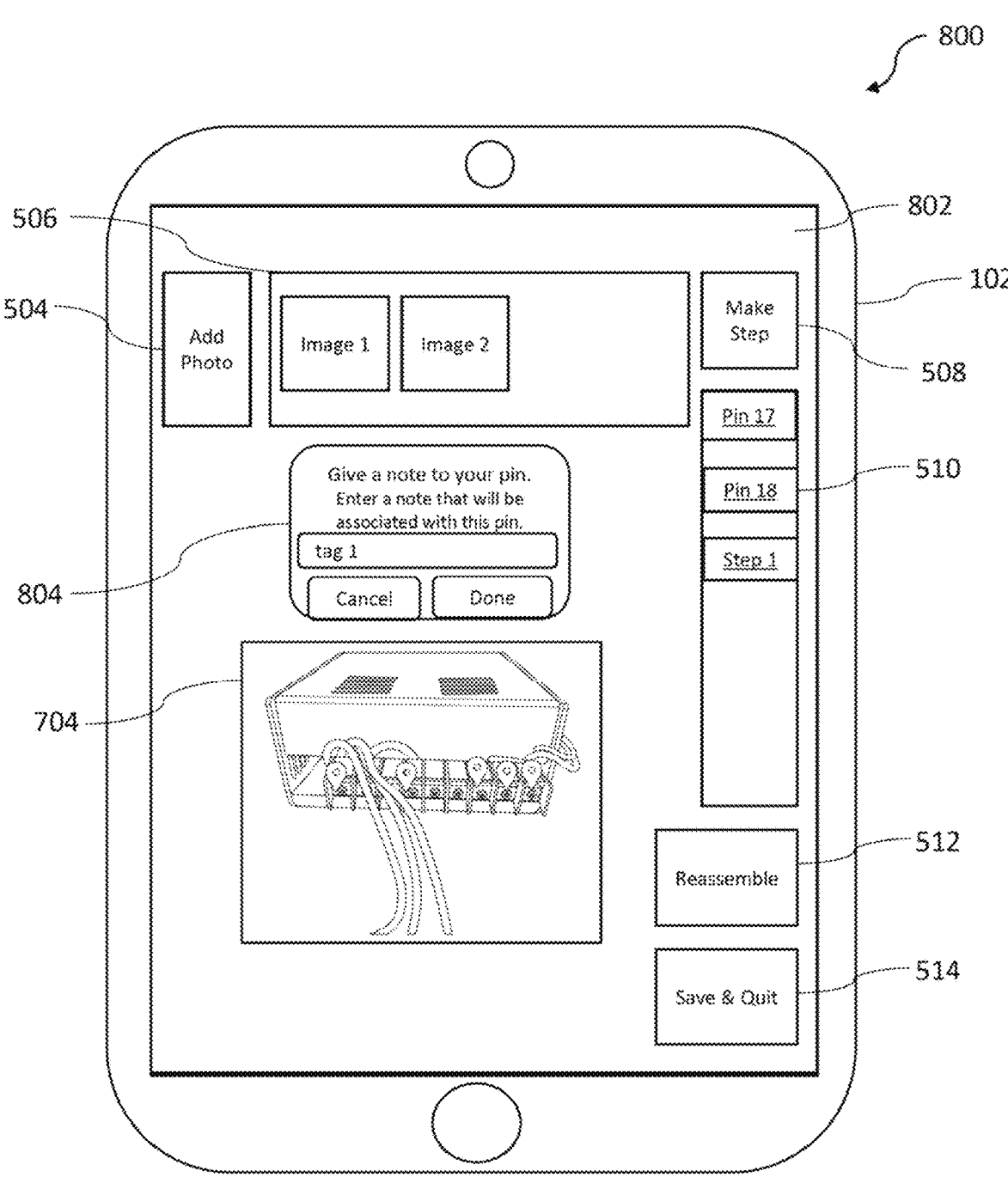
FIG. 8 illustrates an example computing device displaying an example user interface for guiding disassembly and reassembly of components of a device, in accordance with an embodiment of the present disclosure.

Referring now to FIG. 8, an example 800 computing device 102 displaying an example user interface 802 for guiding disassembly and reassembly of components of a device 104, in accordance with an embodiment of the present disclosure. The user interface 802 may include a first display area 504 corresponding to adding a photo of a device. The user interface 802 may include a second display area 506 corresponding to clicking on the added photo to begin working on the project. The user interface 802 may include a third display area 508 corresponding to make step. The user interface 802 may include a fourth display area 510 corresponding to tapping on the image to create a new step. The user interface 802 may include a fifth display area 512 corresponding to reassembling of the device 104. The user interface 802 may include a sixth display area 514 corresponding to saving and quit the project of the user interface 802. The user interface 802 may include a seventh display area 704 corresponding to an image of the device 104. The user interface 802 may include an eighth display area 804 corresponding to the metadata of a component in the image. The metadata may include information such as the original location of each component, its purpose, or specific instructions related to its disassembly and reassembly.

Referring now to FIG. 9, a flowchart of a method 900 of guiding disassembly and reassembly of components of a device 104, in accordance with an embodiment of present disclosure. FIG. 9 is explained in conjunction with FIG. 1 and FIG. 2. The method 900 may include a plurality of steps.

At step 902, at least one image of the device 104 at various stages of disassembly may be captured via one or more sensors.

Further at step 904, a plurality of components of the device being disassembled may be determined in the at least one image of the device 104 based on visual detection of each of the plurality of the components by a user.

Further at step 906, the plurality of components may be consecutively numbered in the at least one image to determine a plurality of numbered components based on tapping, by the user, on each of the plurality of components via a user interface.

Further at step 908, metadata corresponding to the plurality of components may be added in the at least one image via the user interface. In an embodiment, the metadata added to the images may include information such as the original location of each component, its purpose, or specific instructions related to its disassembly and reassembly.

Further at step 910, the at least one image may be stored with the plurality of numbered components, and associated metadata in a database for easy access and retrieval during reassembly.

The disclosed method and system aim to address the technical problem of effectively disassembling and reassembling various devices, such as electronic gadgets, appliances, and machinery, by introducing a comprehensive tracking and documentation approach. This method tackles the challenges and complexities often encountered during the disassembly and reassembly processes, particularly the difficulties in organizing and tracking components, which can lead to errors and inefficiencies.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps bring an improvement in the functioning of the device itself as the claimed steps provide a technical solution to a technical problem.

The specification has described method and system for guiding disassembly and reassembly of components of a device. The illustrated steps are set out to explain the exemplary embodiments shown, and it should be anticipated that ongoing technological development will change the manner in which particular functions are performed. These examples are presented herein for purpose of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits, and advantages. These also include embodiments in which the components and/or steps are arranged and/or ordered differently.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method for guiding disassembly and reassembly of components of a device, the method comprising:
  capturing, by a processor, at least one image of the device at various stages of disassembly via one or more sensors;
  determining, by the processor, a plurality of components of the device being disassembled in the at least one image of the device based on visual detection of each of the plurality of components by a user;
  consecutively numbering, by the processor, the plurality of components in the at least one image to determine a plurality of numbered components based on tapping, by the user, on each of the plurality of components via a user interface;
  adding, by the processor, metadata corresponding to the plurality of components in the at least one image via the user interface, wherein the metadata added to the images includes information such as the original location of each component, its purpose, or specific instructions related to its disassembly and reassembly; and
  storing, by the processor, the at least one image with the plurality of numbered components, and associated metadata in a database for easy access and retrieval during reassembly.

2. The method of claim 1, further comprising providing a second set of disassembled components corresponding to a second set of the plurality of components in a divided tray for physically organizing the second set of disassembled components.

3. The method of claim 1, further comprising allowing a user to follow reverse order of the disassembly of the device through the plurality of numbered components, to guide the reassembly.

4. The method of claim 1, further comprising displaying the component-specific metadata during the reassembly to provide additional instructions for accurate reinstallation of the first set of disassembled components and the second set of disassembled components.

5. The method of claim 1, wherein the divided tray or affixable numbered tags provided for physically organizing the disassembled components are labelled by the user according to the corresponding numbered components from the plurality of numbered components in the images.

6. The method of the claim 1, further comprising providing a first set of disassembled components corresponding to a first set of the plurality of components with an affixable numbered tags for physically organizing the first set of disassembled components.

7. A system for guiding disassembly and reassembly of components of a device, comprising:
  a processor;
  a memory communicably coupled to the processor, wherein the memory stores processor-executable instructions, which, upon execution, cause the processor to:
    capture at least one image of the device at various stages of disassembly via one or more sensors;
    determine a plurality of components of the device being disassembled in the at least one image of the device based on visual detection of each of the plurality of components by a user,
    consecutively number the plurality of components in the at least one image to determine a plurality of numbered components based on tapping, by the user, on each of the plurality of components via a user interface;
    add metadata corresponding to the plurality of components in the at least one image via the user interface, wherein the metadata added to the images includes information such as the original location of each component, its purpose, or specific instructions related to its disassembly and reassembly; and
  a database coupled to the processor for storing the at least one image with the plurality of numbered components, and associated metadata for easy access and retrieval during reassembly.

8. The system of claim 7, further comprising affixable numbered tags provided for physically organizing a first set of disassembled components corresponding to a first set of the plurality of components.

9. The system of claim 7, further comprising a divided tray provided for physically organizing a second set of disassembled components corresponding to a second set of the plurality of components.

10. The system of claim 7, wherein the processor is further configured to allow a user to follow the reverse order of the disassembly of the device through the plurality of numbered components to guide the reassembly.

11. The system of claim 7, wherein the processor is further configured to display the component-specific metadata during reassembly to provide additional instructions for accurate reinstallation of the first set of disassembled components and the second set of disassembled components.

12. The system of claim 7, wherein the divided tray or affixable numbered tags provided for physically organizing the disassembled components are labelled by the user according to the corresponding numbered components from the plurality of numbered components in the images.

13. A non-transitory computer-readable medium storing computer-executable instructions for guiding disassembly and reassembly of components of a device, the computer-executable instructions configured for:
  capturing at least one image of the device at various stages of disassembly via one or more sensors;
  determining a plurality of components of the device being disassembled in the at least one image of the device based on visual detection of each of the plurality of components by a user;
  consecutively numbering the plurality of components in the at least one image to determine a plurality of numbered components based on tapping, by the user, on each of the plurality of components via a user interface;

adding metadata corresponding to the plurality of components in the at least one image via the user interface, wherein the metadata added to the images includes information such as the original location of each component, its purpose, or specific instructions related to its disassembly and reassembly; and storing the at least one image with the plurality of numbered components, and associated metadata in a database for easy access and retrieval during reassembly.

14. The non-transitory computer-readable medium of claim 13, the computer-executable instructions are configured for:

allowing the user to follow reverse order of the disassembly of the device through the plurality of numbered components, to guide the reassembly.

* * * * *